United States Patent [19]

Misaka et al.

[11] Patent Number: 4,842,258

[45] Date of Patent: Jun. 27, 1989

[54] COMPOSITE ENGINE MOUNT

[75] Inventors: Toru Misaka; Sadafumi Fukumura, both of Toyota, Japan

[73] Assignee: Toyota Jidosha Kabushiki Kaisha, Aichi, Japan

[21] Appl. No.: 169,509

[22] Filed: Mar. 17, 1988

[30] Foreign Application Priority Data

| Apr. 17, 1987 | [JP] | Japan | 62-57407[U] |
| Apr. 21, 1987 | [JP] | Japan | 62-59272[U] |
| Jul. 8, 1987 | [JP] | Japan | 62-103890[U] |
| Nov. 18, 1987 | [JP] | Japan | 62-175048[U] |
| Nov. 18, 1987 | [JP] | Japan | 62-175049[U] |

[51] Int. Cl.⁴ ............ B60G 15/04; F16F 7/10; F16F 15/04; F16M 13/00
[52] U.S. Cl. .............. 267/140.1; 180/300; 180/312; 248/562; 248/636; 248/659; 248/573; 267/219; 267/140.3; 267/140.5; 267/153; 267/35
[58] Field of Search .............. 248/636, 562, 659, 573, 248/605-607; 267/140.1-141.7, 219, 220, 35, 140, 153, 152, 279, 280; 180/300, 312, 902

[56] References Cited

U.S. PATENT DOCUMENTS

| 4,262,889 | 4/1981 | Moore | 267/140.5 |
| 4,445,662 | 5/1984 | Fukushima et al. | 248/659 X |
| 4,456,213 | 6/1984 | Fukushima et al. | 248/659 X |
| 4,467,992 | 8/1984 | Morimura et al. | 248/659 |
| 4,606,427 | 8/1986 | Beer | 267/140.5 X |
| 4,610,420 | 9/1986 | Fukushima et al. | 248/659 X |
| 4,610,421 | 9/1986 | Ohta et al. | 248/659 X |
| 4,721,288 | 1/1988 | Andrä et al. | 267/140.1 X |
| 4,721,292 | 1/1988 | Saito | 267/140.1 |
| 4,757,982 | 7/1988 | Andrä et al. | 267/140.1 X |

FOREIGN PATENT DOCUMENTS

58-175230 11/1983 Japan.
59-131636 9/1984 Japan.
62-3540 3/1987 Japan.

Primary Examiner—Douglas C. Bulter
Attorney, Agent, or Firm—Oliff & Berridge

[57] ABSTRACT

A composite engine mount includes first and second members and an elastic member. The second member defines a space into which one portion of the first member extends. A first stopper rubber for providing a front and rear, left and right and rebound stopper is fixed to the one portion of the first member. Due to the structure, an assembly of the mount and brackets to be fixed to the first and second members can be made small. Such a mount is suitable for use in a left-hand and a right-hand engine mount for a transversely mounted engine.

13 Claims, 11 Drawing Sheets

COMPOSITE ENGINE MOUNT

BACKGROUND OF THE INVENTION

1. Field of the Invention

The present invention relates to a composite engine mount suitable for use in a vehicle body for supporting a transversely mounted engine, that is, an engine which is mounted to a vehicle with its axis directed perpendicular to the longitudinal axis of the vehicle.

2. Description of the Related Art

When an engine mount is used as a left-hand or right-hand mount for supporting a transversely mounted engine, the engine mount must bear the loads from the engine in every direction, that is, in the front and rear, left and right, and vertical directions. In particular, the vehicle body defines three orthogonal directions: a longitudinal direction, a transverse direction perpendicular to the longitudinal direction, and a vertical direction perpendicular to the plane defined by the longitudinal and transverse directions. Therefore, the engine mount must include at least one stopper which can act or bear loads in every direction.

Japanese Utility Model Publication SHO No. 58-175230 discloses an engine mount including a stopper which can act in only one horizontal direction of either front and rear or left and right direction. Japanese Utility Model Publication SHO No. 59-131636 discloses an engine mount including only a vertical stopper. Because the stoppers are provided in the liquid chambers within the metal members of the engine mounts, an excessive orifice effect would happen. In this meaning, a stopper is preferable to be provided outside a metal member.

Figure 13:
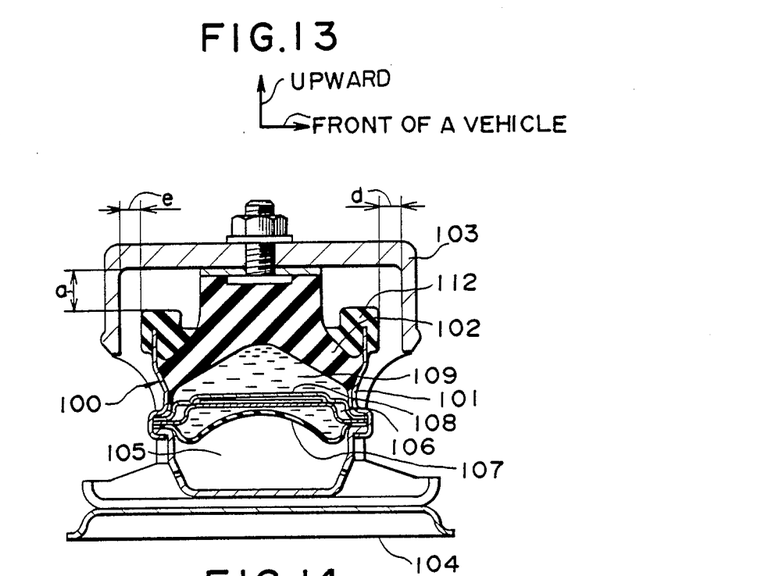
FIG. 13 is a sectional view of a hypothetical composite mount.
Figure 14:
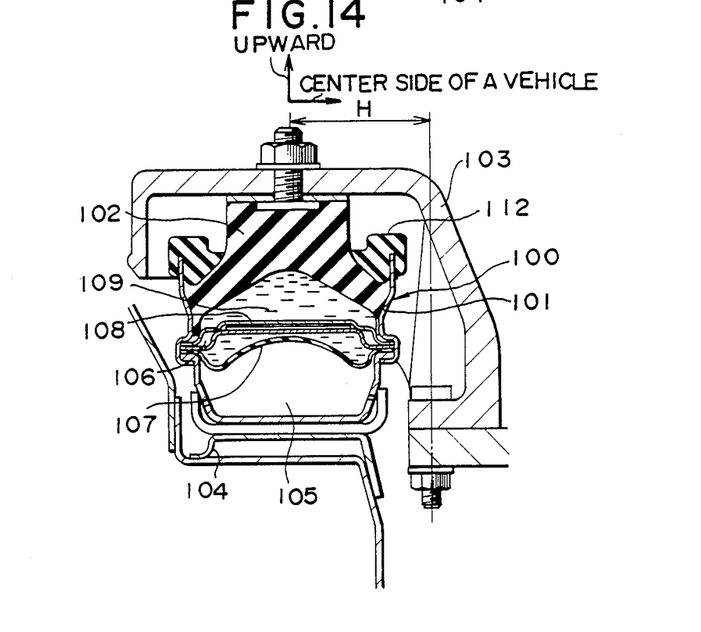
FIG. 14 is another sectional view of the mount of FIG. 13.
Figure 15:
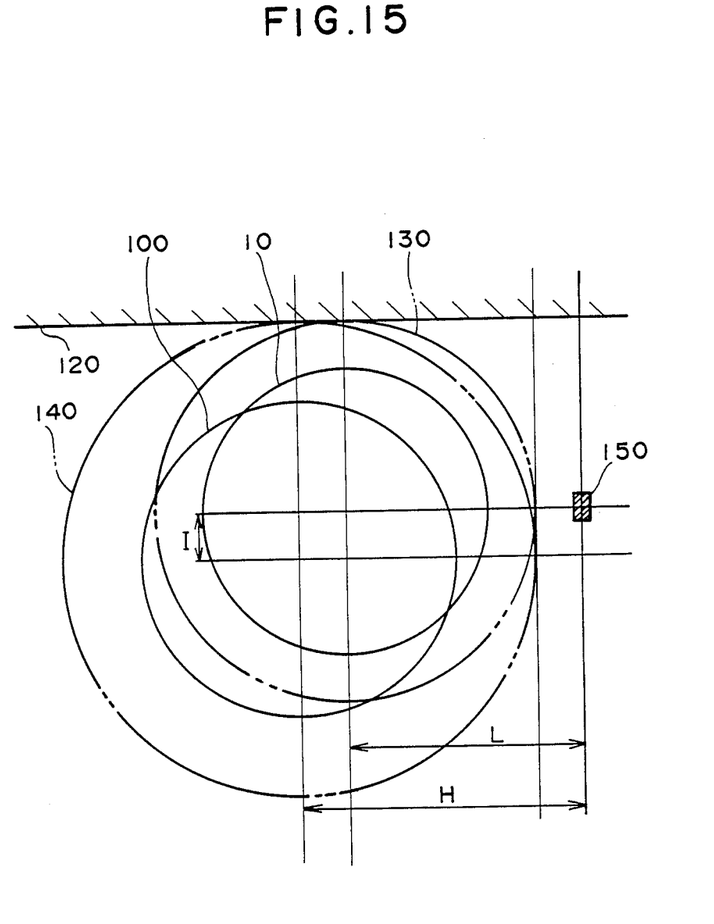
FIG. 15 is a schematic arrangement illustrating relationships between the mount of FIG. 13 and a mount in accordance with the present invention.

FIGS. 13 and 14 illustrate a hypothetical composite engine mount 100 which has been developed from the disclosed in Japanese Utility Model Publication SHO No. 58-175230. FIG. 15 illustrates relationships in arrangement among composite engine mount 100, a space 140 to be provided for composite engine mount 100 and a fixed member 120 of a vehicle located adjacent to composite engine mount 100. The hypothetical mount is not a known mount but helps to understand the drawbacks included in engine mounts. In the composite engine mount 100 including a metal member 101 and a rubber member 102 fixed to metal member 101, an engine-side bracket 103 is coupled to rubber member 102 while a body-side bracket 104 is coupled to metal member 101. A gas chamber 105, an orifice 106, a diaphragm 107, a separator 108 and a liquid chamber 109 are provided within a space defined by metal member 101 and rubber member 102. A front and rear, left and right and vertical bounce or bound stopper 112 which should not be provided in liquid chamber 109 is provided outside metal member 101 and is fixed to an upper end portion of metal member 101. There is no rebound stopper. Because stopper 112 is located outside metal member 101, a bound stopper clearance a, a front stopper clearance d and a rear stopper clearance e are considerably large, and space 140 is larger than a space 130 which is to be provided for a composite engine mount 10 of the present invention illustrated hereinafter.

There are the following drawbacks in such mounts which will be easily understood referring to the hypothetical mount of FIGS. 13, 14 and 15:

(i) Since stopper 112 is located outside metal member 101, sufficient clearances a, d and e must be provided between composite engine mount 100 and the adjacent member 120 and space 140 to be provided for mount 100 is large. As a result, an overhang amount H of mount 100, that is, a distance between a center of mount 100 and a coupling portion 150 between bracket 103 and an engine-side member is larger than an overhang L of a mount 10 in accordance with the present invention. Also, an offset amount I of mount 100, that is, a distance in the direction perpendicular to an overhang direction between the center of mount 100 and coupling portion 150 is large. A large amount of overhang and offset increases the size and weight of the assembly of mount 100 and brackets 103 and 104, decreases the resonance frequency of the assembly and makes it difficult to extract an expected potential from the mount.

(ii) Since the mounts usually do not include a stopper which can act in every direction, the mounts are not suitable for use as a left-hand or right-hand mount for supporting a transversely mounted engine.

SUMMARY OF THE INVENTION

An object of the invention is to provide a composite engine mount which decreases a space for disposing the mount assembly and includes stoppers acting in every direction without being accompanied by an increase in space.

The above object and others can be achieved by the following composite engine mounts in accordance with the present invention wherein the composite engine mount comprises:

a first member of rigid material to be fixed to an engine-side bracket;

a second member of rigid material to be fixed to a body-side bracket, the first and second members defining a space inside the second member into which one portion of the first member extends;

an elastic member extending between and connected to the first and second members so as to allow the first and second members to move relative to each other; and a first stopper rubber fixed to the one portion of the first member to provide a front and rear, left and right and rebound stopper in cooperation with the second member. Accordingly, the stopper is capable of bearing loads in each of the three orthogonal directions.

More particularly, the invention relates to a composite engine mount comprising:

a first member of rigid material to be fixed to an engine-side bracket, the first member including a main portion and a stopper arm extending radially outward and obliquely downward from the main portion;

a second member of rigid material to be fixed to a body-side bracket, the second member including an annular portion radially spaced from the main portion of the first member and axially overlapping with at least one portion of the main portion of the first member and a lip extending radially inward from the annular portion, the first and second members defining a space opening upward between the annular portion and the lip of the second member and the main portion of the first member into which the stopper arm of the first member extends;

an elastic member extending between and connected to the first and second members so as to allow the first and second members to move relative to each other; and a first stopper rubber fixed to the stopper arm of the first member to provide a front and rear (longitudinal direction), left and right (transverse direction) and rebound (vertical direction) stopper in cooperation with the second member.

According to the above-described composite engine mount, since the front and rear, left and right and rebound stopper is compactly disposed in the space inside the second member, the stopper does not interfere with adjacent members outside the mount when the first and second members move relative to each other. Accordingly, the mount assembly including a bracket to which the mount is fixed can be made smaller than the conventional one and the weight of the mount assembly can be greatly decreased, which raises the resonance frequency of the vibrational system including the mount and makes it possible to extract the expected potential from the mount.

Also, the front and rear, left and right and rebound stopper can effectively act in the horizontal and vertical directions.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, wherein.

DETAILED DESCRIPTION OF THE PREFERRED EMBODIMENTS

Figure 1:
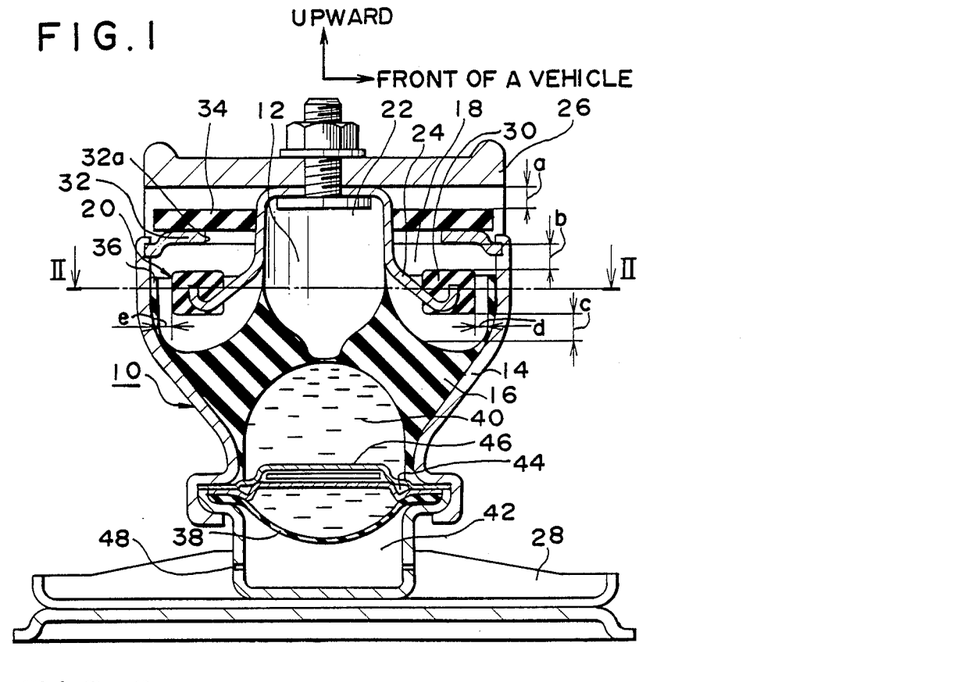
FIG. 1 is a sectional view of a composite mount according to the first embodiment of the present invention.
Figure 2:
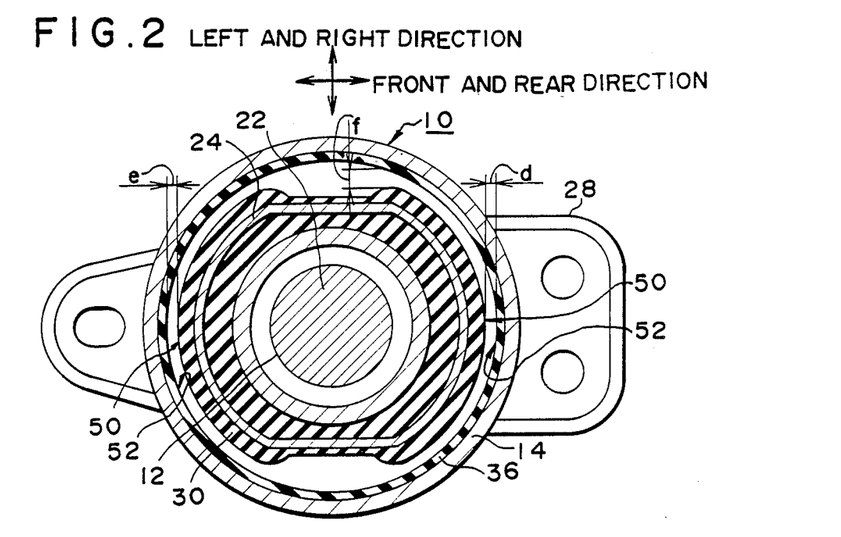
FIG. 2 is a sectional view of the mount taken along line II—II of FIG. 1.

At first, the structures which are common to every embodiment will be illustrated referring to, for example, FIGS. 1 and 2. FIG. 1 illustrates a composite mount 10 in section as viewed from a side of a vehicle, when it is used as a left-hand or right-hand engine mount for supporting a transversely mounted engine, that is, an engine mounted with its longitudinal axis directed perpendicular to the longitudinal axis of a vehicle. Therefore, the left and right direction of FIG. 1 corresponds to a front and rear (longitudinal) direction of a vehicle; the direction at a right angle to the plane of FIG. 1 corresponds to a left and right (transverse) direction of a vehicle; and the up and down direction of FIG. 1 corresponds to a vertical direction of a vehicle.

A composite engine mount 10 includes a first member 12 of rigid material, for example, steel and a second member 14 of rigid material. First and second members 12 and 14 define a space 18 therebetween and inside second member 12. An elastic member 16 constructed of elastic material, for example, rubber extends between first and second members 12 and 14 and is connected to first member 12 at one end thereof and to second member 14 at the other end thereof by means of, for example, vulcanization. Elastic member 16 allows first and second members 12 and 14 to move relative to each other in horizontal and vertical directions. One portion of first member 12 extends into space 18. A first stopper rubber 30 is fixed to the one portion of first member 12 to provide a front and rear, left and right and rebound stopper 20 in cooperation with second member 14.

First member 12 is fixed to an engine-side bracket 26 and second member 14 is fixed to a body-side bracket 28 of a vehicle so that composite mount 10 provides a composite engine mount.

More particularly, first member 12 includes a main portion 22 and a stopper arm 24 which extends radially outward and obliquely downward from main portion 22. A lower end portion of stopper arm 24 is bent and to the bent portion first stopper rubber 30 is fixed by means of, for example, vulcanization. Second member 14 includes an annular portion which is radially spaced from stopper arm 24 and axially overlaps with at least one portion of main portion 22 of first member 12 so as to surround the at least one portion of main portion 22 of first member 12 from outside in a radial direction. Second member 14 further includes a lip 32 of rigid material which extends radially inward from an upper end portion of the annular portion of second member 14. Elastic member 16 and second member 14 define space 18 inside the annular portion of second member 14 and above elastic member 16. Space 18 is an annular space opening upward and an exit of space 18 is defined between an inside surface of lip 32 and an outside surface of stopper arm 24 of first member 12.

First stopper rubber 30 is fixed to a radially outer and lower end portion of stopper arm 24 which is bent upward. An outside surface of first stopper rubber 30 and an inside surface of the annular portion of second member 14 (an inside surface of an elastic layer of rubber 36 when elastic layer 36 is provided at an inside surface of the annular portion of second member 14) define therebetween a front and rear stopper clearance d, e, left and right stopper clearance f, and a rebound stopper clearance b in the front and rear, left and right, and vertical directions, respectively, when no relative movement takes place between first and second members 12 and 14. First stopper rubber 30 strikes second member 14 (elastic layer 36 when it is provided) when a relative movement greater than one of the ,clearances takes place between first member 12 and second member 14 to operate as front and rear, left and right and rebound stopper 20 in cooperation with second member 14.

A second stopper rubber 34 for providing a bound stopper is provided between lip 32 of second member 14 and an engine-side bracket 26 to which first member 12 is fixed. In the embodiment of FIG. 1, second stopper rubber 34 is fixed to lip 32, but it may be fixed to engine-side bracket 26 or may be interposed between lip 32 and engine-side bracket 26 without being fixed to the two. Second stopper rubber 34 defines a bound stopper clearance a in a vertical direction between second stopper rubber 34 and one of lip 32 and engine-side bracket 26 when no relative movement takes place between first and second members 12 and 14. Second stopper rubber 34 strikes lip 32 and engine-side bracket 26 to be squeezed by the two when a relative vertical movement greater than stopper clearance a takes place between first and second members 12 and 14 so that second rubber 34 acts as a bound stopper in cooperation with lip 32 and engine-side bracket 26. Because the bound stopper mainly comprises second stopper rubber 34, the bound stopper is denoted by the reference numeral 34.

An elastic layer of rubber 36 may be fixed to an inside surface of the annular portion of second member 14 by means of, for example, vulcanization. Elastic layer 36 may be integrally connected to elastic member 16. More particularly, when elastic layer 36 is formed, front and rear stopper clearance d, e and left and right stopper clearance f are defined between the inside surface of elastic layer 36 and the outside surface of first stopper rubber 30 in the front and rear and the left and right directions, respectively.

A space c provided between first stopper rubber 30 and elastic member 16 in the vertical direction is greater than bound stopper clearance a.

Second member 14 further includes a container portion on the lower side of the annular portion of second member 14. The container portion of second member 14 and elastic member 16 define a substantially closed space between the two. The closed space includes a liquid chamber 40 and a gas chamber 42 which are separated from each other by a diaphragm 38. Liquid chamber 40 is further separated into a plurality of sub-chambers separated from each other by a spacer 46 including an orifice 44 through which the sub-chambers fluidly connect each other. When a liquid flows through orifice 44, a damping force is induced. Gas chamber 42 is connected to an atmosphere via hole 48 formed in the container portion of second member 14.

Space 18 where first stopper rubber 30 is provided is not filled with a liquid and opens to the atmosphere. Therefore, provision of first stopper rubber 30 does not affect an orifice effect of the mount 10.

Next, structures which are different with respect to each embodiment will be illustrated.

In the first embodiment which is shown in FIGS. 1 and 2, an outside surface of stopper arm 24, an outside surface of first stopper rubber 30, an inside surface of the annular portion of second member 14 and an inside surface of elastic layer 36 have circular or arc cross sections which are concentric to each other. The diameters of the circular or arc cross sections are different from each other but the axes of the circular or arc cross sections are common.

Figure 3:
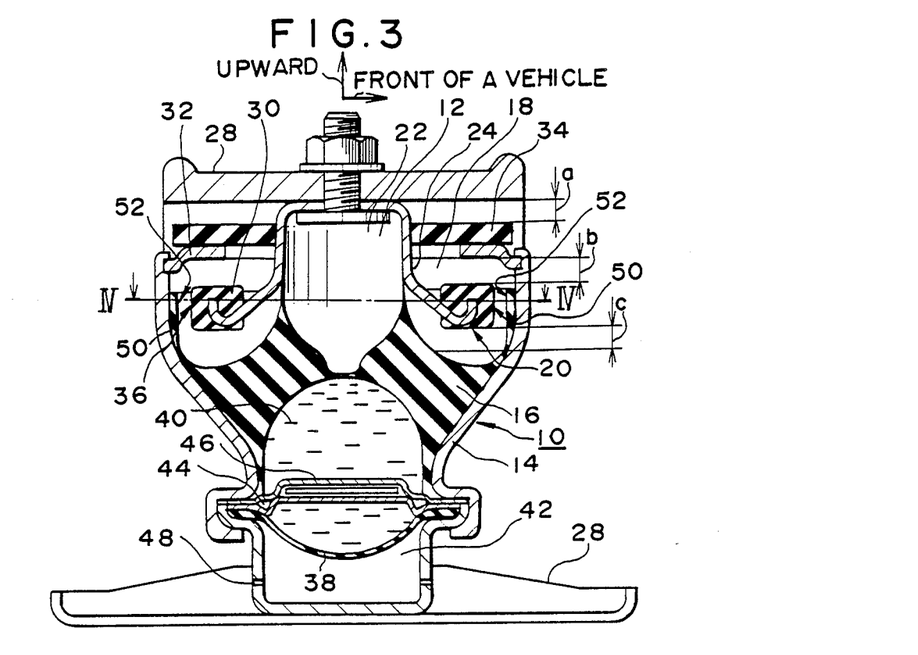
FIG. 3 is a sectional view of a composite engine mount according to the second embodiment of the present invention.
Figure 4:
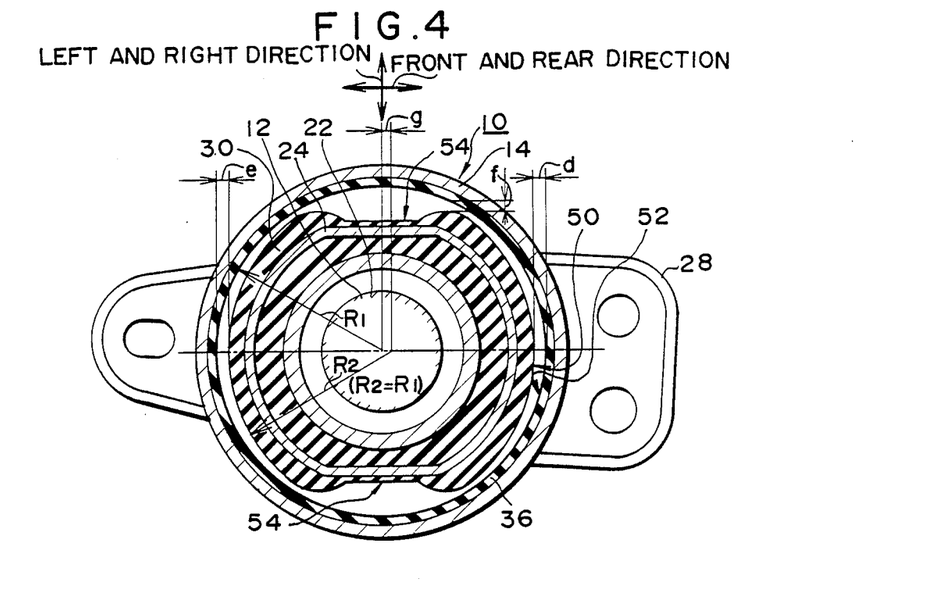
FIG. 4 is a sectional view of the mount taken along line IV—IV of FIG. 3.

In the second embodiment which is shown in FIGS. 3 and 4, a front and rear stopper clearance d, e is formed so as to have a constant width in the front and rear direction of a vehicle so that a striking surface of first stopper rubber 30 can strike an inside surface of elastic layer of rubber 36 at the entire striking surface and loads can be dissipated over the entire striking surface to increase the durability of mount 10. More particularly, one portion of an outside surface of first stopper rubber 30 is curved to provide a striking curved surface 50 having an arc cross section, and at least one portion of elastic layer 36 fixed to second member 14, radially corresponding to striking curved surface 50 of first stopper rubber 30, is also curved to provide a receiving curved surface 52 having an arc cross section. (To make clear the relationship between the first embodiment and the second embodiment, the surfaces of FIG. 2 corresponding to surfaces 50 and 52 of FIG. 4 are denoted with the same reference numerals 50 and 52.) A radius of curvature $R_2$ of striking curved surface 50 and a radius of curvature $R_1$ of receiving curved surface 52 are equal to each other, and a center of curvature of striking curved surface 50 and a center of curvature of receiving curved surface 52 are offset from each other in one direction of mount 10, for example, in the front and rear direction of a vehicle.

Striking curved surface 50 and receiving curved surface 52 oppose each other in the one direction of composite engine mount 10 and are provided on each side of the axis of composite engine mount 10 in the one direction.

The outside surface of first stopper rubber 30 except striking curved surface 50 recedes from a circumferential extension of striking curved surface 50 toward the axis of composite engine mount 10 in the radial direction.

Figure 5:
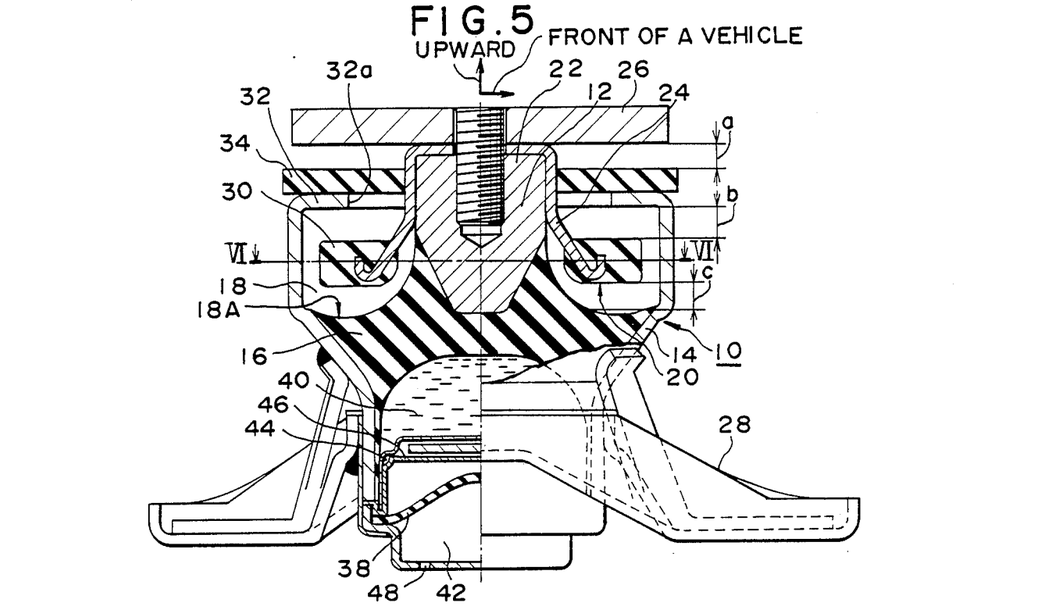
FIG. 5 is a sectional view of a composite engine mount according to the third embodiment of the present invention.
Figure 6:
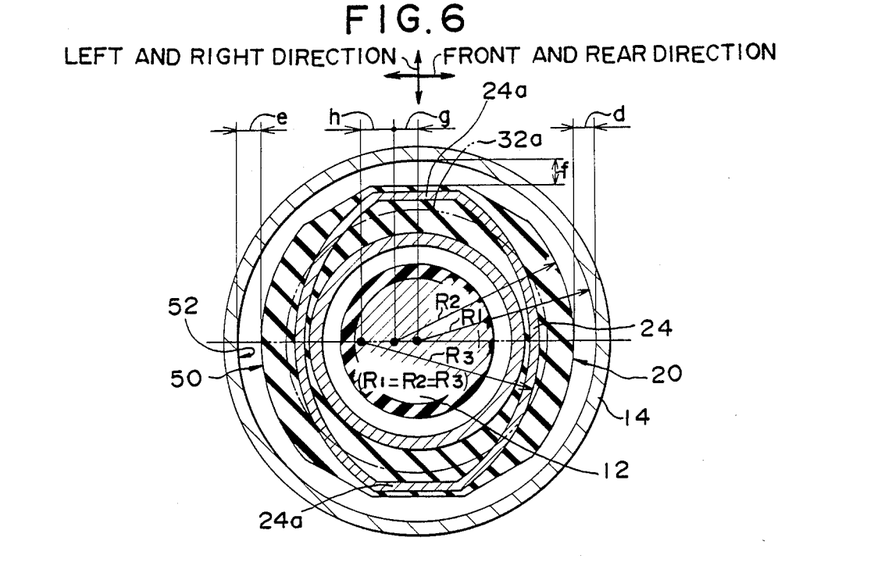
FIG. 6 is a sectional view of the mount taken along line VI—VI of FIG. 5.

In the third embodiment which is shown in FIGS. 5 and 6, a front and rear stopper clearance d, e is formed to have a constant width in the front and rear direction of a vehicle, and further, a portion of first stopper rubber 30 corresponding to the front and rear direction is formed to have a constant thickness in the front and rear direction. More particularly, one portion of an outside surface of stopper arm 24 to which first stopper rubber 30 is fixed is curved to have an arc cross section. Also, one portion of an outside surface of first stopper rubber 30 which radially corresponds to the curved outside surface of stopper arm 24 is curved to provide a striking curved surface 50 having an arc cross section. At least one portion of an inside surface of elastic layer of rubber 36 fixed to second member 14 which radially corresponds to striking surface 50 of first stopper rubber 30 is curved to provide a receiving curved surface 52 having an arc cross section. A radius of arc $R_3$ of the one portion of the outside surface of stopper arm 24, a radius of arc $R_2$ of striking curved surface 50 and a radius of arc $R_1$ of receiving curved surface 52 are equal to each other, and a center of arc of the one portion of the outside surface of stopper arm 24, a center of arc of striking curved surface 50 and a center of arc of receiving curved surface 52 are offset from each other in the front and rear direction of a vehicle by an amount g, h.

Striking curved surface 50 and receiving curved surface 52 oppose each other in the one direction of composite engine mount 10. The portion with a curved surface of stopper arm 24, striking curved surface 50 and receiving curved surface 52 are provided on each side of the axis of composite mount 10 in the front and rear direction.

The outside surface of stopper arm 24 except the portion radially corresponding to striking curved surface 50 extends radially outside an inner surface 32a of lip 32 of second member 14.

Figure 7:
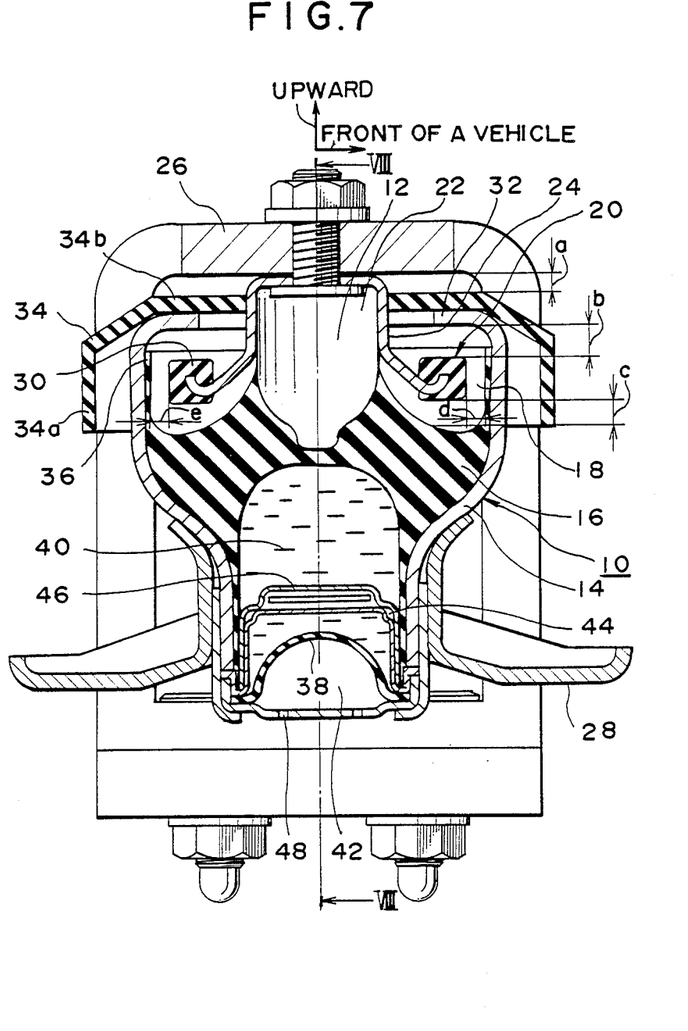
FIG. 7 is a sectional view of a composite engine mount according to the fourth embodiment of the present invention.
Figure 8:
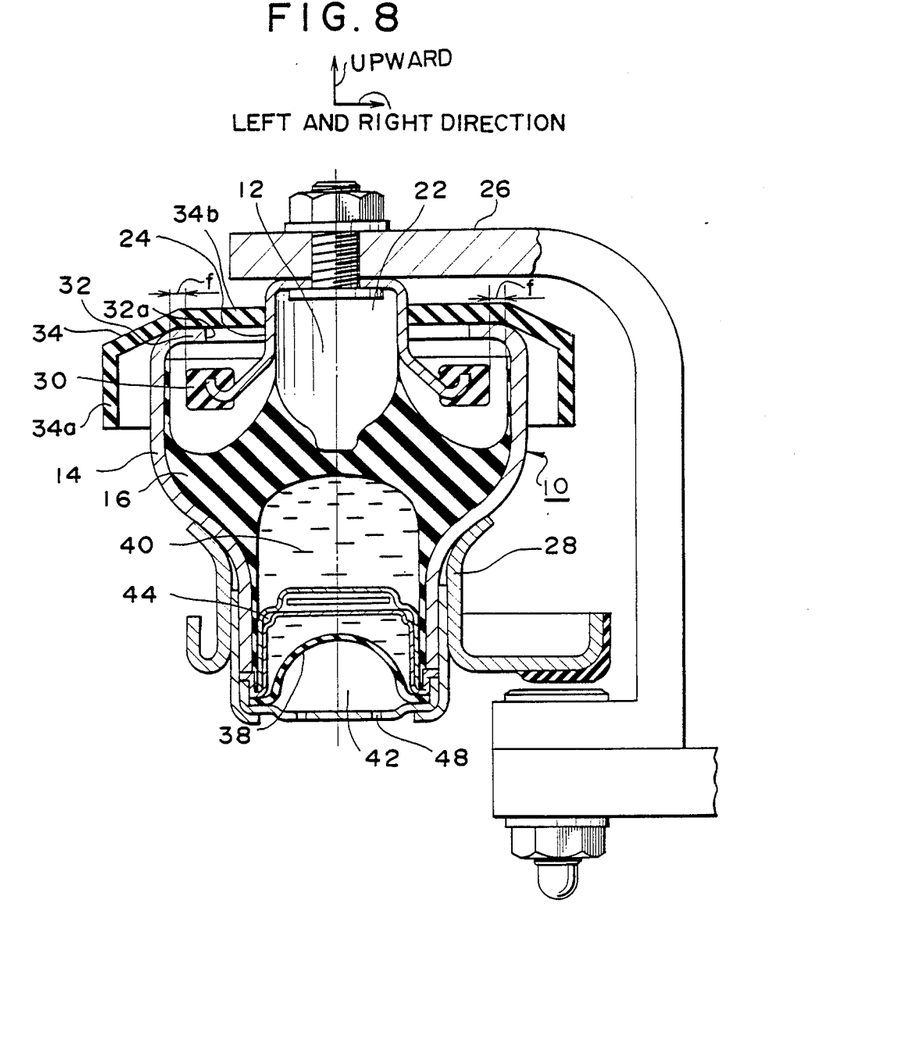
FIG. 8 is a sectional view of the mount taken along line VIII—VIII of FIG. 7.

In the fourth embodiment shown in FIGS. 7 and 8, second stopper 34 is modified to prevent foreign substances from invading into space 18. Space 18 between first and second members 12 and 14 and inside second member 14 is a space which is concave upward. Second stopper rubber 34 constituting the bound stopper is provided at an exit of space 18 to close the exit by extending at least between lip 32 and the outside surface of first member 12. Second stopper rubber 34 includes a first portion 34b radially extending between the first and second members 12 and 14 and a second portion 34a further extending downward from a radially outer portion of first portion 34b so that second portion 34a prevents foreign substances such as a water and a mud from invading into space 18.

Second portion 34a of bound stopper 34 surrounds the annular portion of second member 14 from radially outside.

At least one portion 24a (FIG. 8) of stopper arm 24 except the portion radially corresponding to striking curved surface 50 of first stopper rubber 30 extends radially outside the inner surface 32a of lip 32 of second member 14 so that portion 24a of stopper arm 24 can bear one portion of rebound loads.

Figure 9:
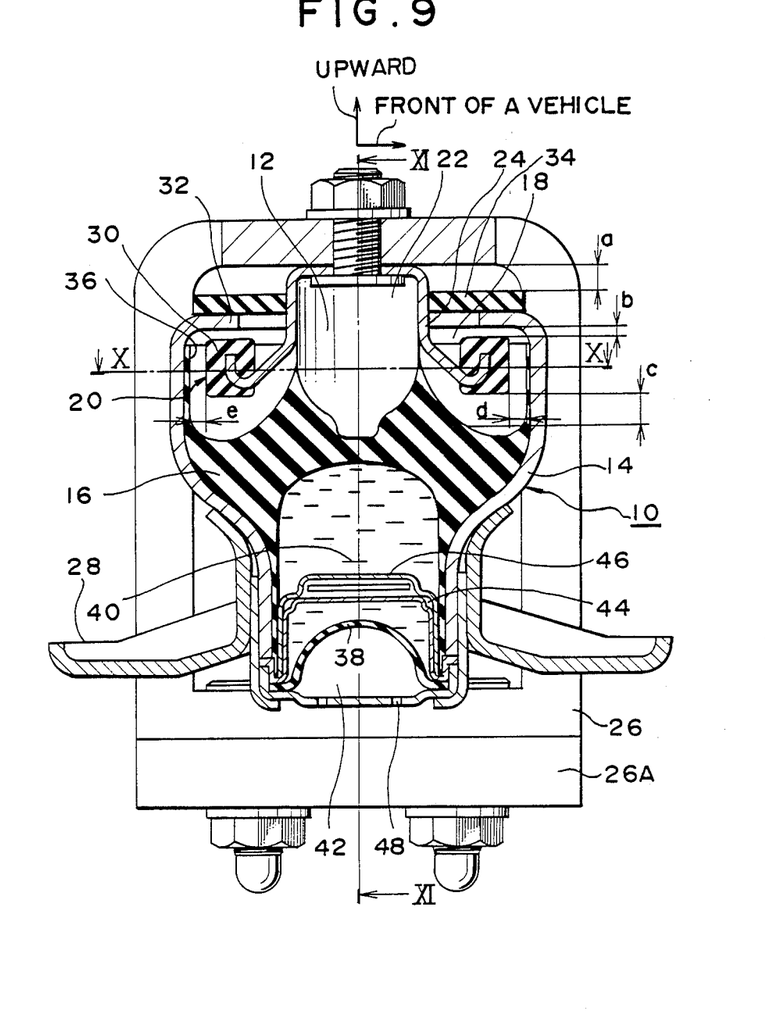
FIG. 9 is a sectional view of a composite engine mount according to the fifth embodiment of the present invention.
Figure 10:
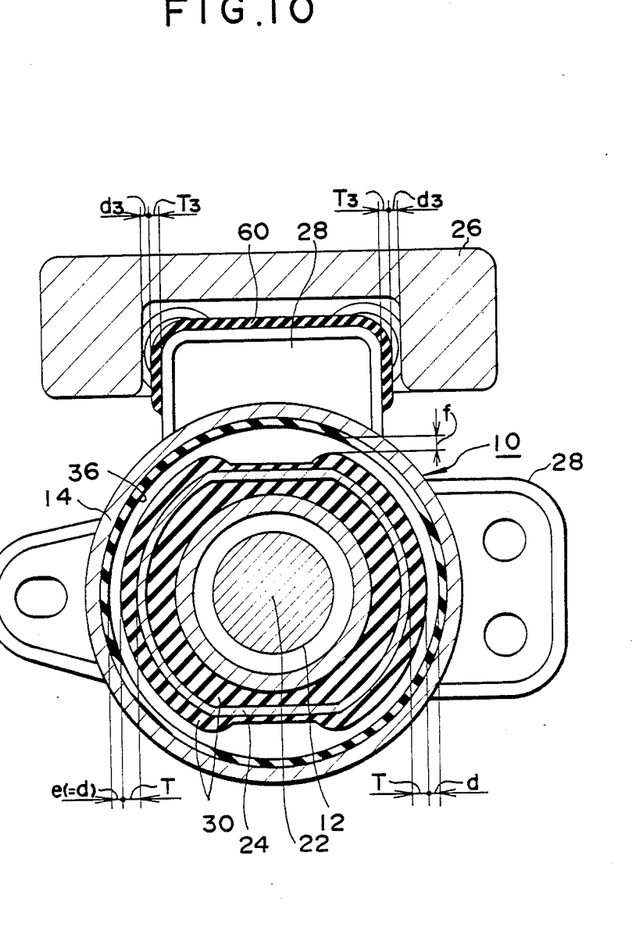
FIG. 10 is a sectional view of the mount taken along line X—X of FIG. 9.
Figure 11:
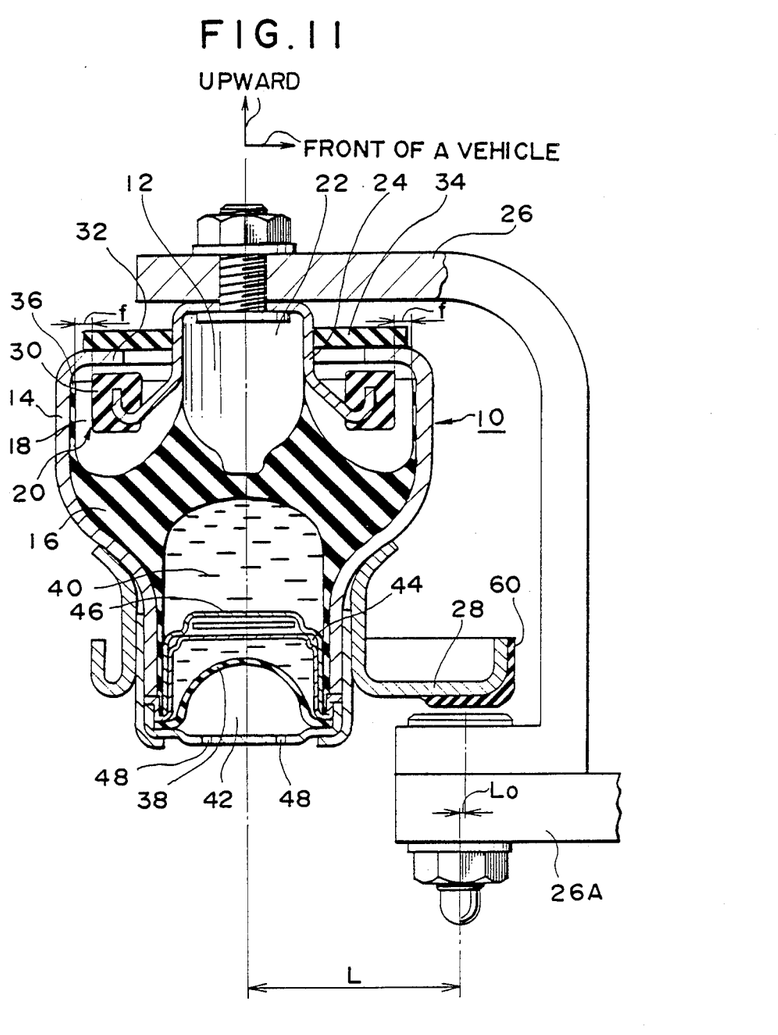
FIG. 11 is a sectional view of the mount taken along line XI—XI of FIG. 9.

In the fifth embodiment shown in FIGS. 9–12, composite engine mount 10 further comprises a third stopper rubber 60 (FIG. 10) which is fixed to body-side bracket 28 fixed to second member 14 and defines a subsidiary front and rear stopper clearance $d_3$ between third stopper rubber 60 and engine-side bracket 26. First and third stopper rubbers 30 and 60 are assembled such that the following relationships hold:

d is smaller than $d_3$; and (d+T) is larger than $(d_3+T_3)$, where d is an amount of the front and rear stopper clearance, T is a thickness of first stopper rubber 30 between an outside surface of first stopper rubber 30 and an outside surface of stopper arm 24, $d_3$ is an amount of the subsidiary front and rear stopper clearance, and $T_3$ is a thickness of third stopper rubber 60.

Figure 12:
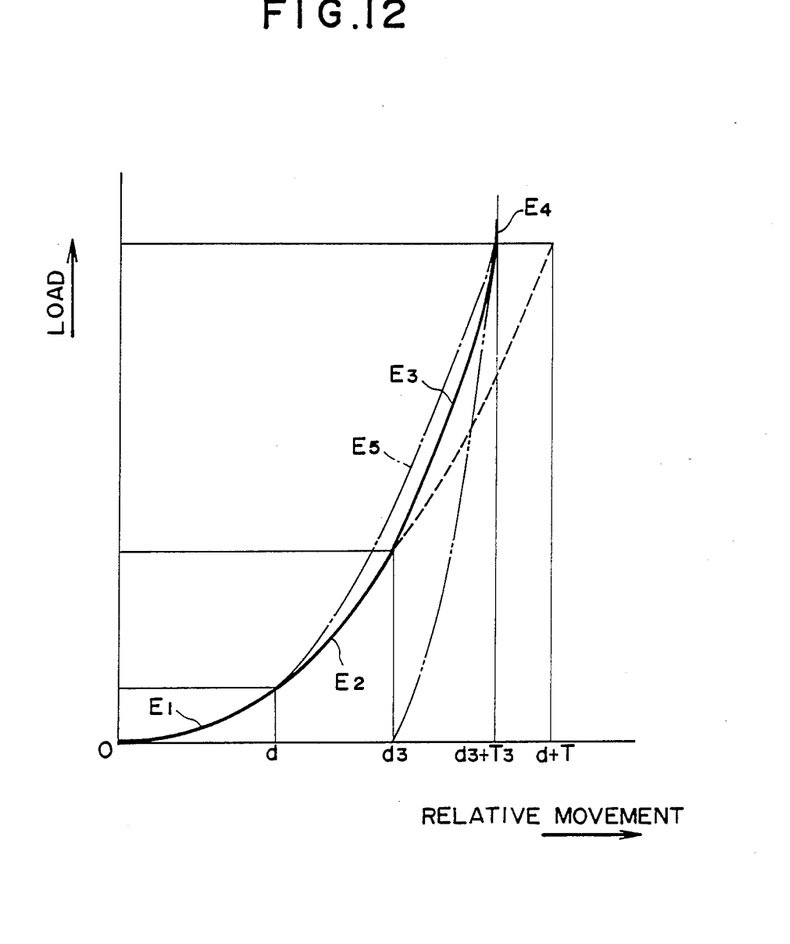
FIG. 12 is a diagram of relationships between a deformation and a load of the mount of FIG. 9.

According to the above relationship that d is smaller than $d_3$, when first and second members 12 and 14 move relative to each other more than the amount d, first stopper rubber 30 strikes second member 14 at first, and then, when first and second members 12 and 14 further move relative to each other, third stopper rubber 60 strikes engine-side bracket 26. Therefore, stoppers 30 and 60 operate according to a characteristic including two characteristic components $E_2$ and $E_3$ which are shown in FIG. 12 and will be explained later in detail.

A spring constant of third stopper rubber 60 is smaller than a spring constant of a first stopper rubber used in a composite engine mount having no third stopper rubber which is illustrated in the first to fourth embodiments.

Third stopper rubber 60 is located nearer to an engine than first stopper rubber 30 in the front and rear direction of a vehicle.

Next, operations and effects of mount 10 will be explained.

At first, operations and effects which are common to every embodiment will be explained. In mount 10, a relative movement between first and second members 12 and 14 in which first and second members 12 and 14 move to approach each other in the axial direction, that is, in the vertical direction, is a bound motion and a relative movement in which first and second members 12 and 14 move away from each other is a rebound motion. An amount of bound and rebound motions is less than a predetermined value, a vibration of an engine is damped by a damping effect which is substantially determined by a spring constant of elastic member 16 and a damping effect of orifice 44. When an amount between first and second members 12 and 14 in the direction of bound, rebound, front and rear, and left and right directions becomes greater than bound stopper clearance a, rebound stopper clearance b, front and rear stopper clearance d, e, left and right stopper clearance f, respectively, front and rear, left and right and rebound stopper 20 and bound stopper 34 act to restrict the relative movement between first and second members to the predetermined value or less.

An important point of the invention is the location of first stopper rubber 30 inside second member 16, which enables front and rear, left and right and rebound stopper 20 not to interfere with adjacent members located outside mount 10 when first and second members 12 and 14 move relative to each other. This means that there is no necessity to prepare a large space around mount 10 to prevent the interference and that it is possible to make the assembly including mount 10 and brackets 26 and 28 smaller in size than the conventional mount. Compactness in size decreases weight of the assembly and raises a resonance frequency of the vibrational system including mount 10 to extract the expected potential, damping ability from mount 10.

Another important point of the invention is that front and rear, left and right and rebound stopper 20 can act in the horizontal directions including front and rear, left and right directions and also in the vertical direction. Since bound stopper 34 is provided between engine-side bracket 26 and lip 32 of second member 14 in a compact manner, provision of bound stopper 34 does not increase the height of mount 10. As a result, mount 10 of the present invention can act in every direction without being accompanied by an increase in size and weight.

Next, operations and effects further obtained which are different in correspondence with each embodiment will be explained.

The operations and effects of the first embodiment (FIGS. 1 and 2) are the same as those described above.

According to the second embodiment (FIGS. 3 and 4), since striking curved surface 50 and receiving curved surface 52 are equal to each other in curvature, striking curved surface 50 can strike receiving curved surface 52 at its entire surface. As a result, the bearing load is dissipated over the entire surface, which makes the load small and improves the durability of mount 10.

According to the third embodiment (FIGS. 5 and 6), since the thickness of the portion of the first stopper rubber 30 corresponding to striking curved surface 50 is made constant along the circumferential direction of the striking curved surface 50, the stresses induced in first stopper rubber 30 become substantially constant along the circumferential direction of striking curved surface 50. As a result, the stresses induced in first stopper rubber 30 become small, which improves the durability of mount 10. In the third embodiment, when one portion of stopper arm 24 extends outside inside surface 32a of lip 32, stopper arm 24 can bear one portion of rebound loads and can reduce the stresses induced in first stopper rubber 30 at the time of an excessive rebound motion.

According to the fourth embodiment (FIGS. 7 and 8), since second stopper rubber 34 includes second portion 34a surrounding second member 14, foreign substances such as a water and mud do not invade into space 18 in which front and rear, left and right and rebound stopper 20 is provided. As a result, stopper 20 is not affected badly by foreign substances and the durability of mount 10 is improved.

In the fifth embodiment (FIGS. 9–12), when loads are small in the front and rear direction of a vehicle, the loads are transmitted via only elastic member 16 as shown by a characteristic $E_1$ of FIG. 12. When loads become large and first stopper rubber 30 strikes second member 14, the loads are transmitted via elastic member 16 and first stopper rubber 30 as shown by a characteristic $E_2$. When loads become larger, third stopper rubber 60 strikes engine-side bracket 26 and the loads are transmitted via elastic member 16, first and third stopper rubbers 30 and 60 as shown by a characteristic $E_3$. When loads become excessively large, third stopper rubber 60 is deformed to a fully compressed state and after the full compression state of third stopper rubber 60, the loads are transmitted directly between engine-side bracket 26 and body-side bracket through third stopper rubber 60 without being accompanied with further deformation of elastic member 16 and rubbers 30 and 60, as shown by a characteristic $E_4$. According to the two-stage characteristic of $E_2$ and $E_3$, the spring constant of first stopper rubber 30 can be made smaller than that of a mount having no third stopper (having a characteristic $E_5$), which improves shock and noise. When an excessively large load acts in the front and rear direction of a vehicle, third stopper rubber 60 is deformed to a fully compressed state thereof prior to first stopper rubber 30 according to the relationship that $(d+T)$ is larger than $(d_3+T_3)$, and after the full compression of third stopper rubber 60, first stopper rubber 30 is no more deformed and the excessive load of front and rear direction is directly born by brackets 26 and 28. As a result, reliability in strength of first stopper rubber 30 is increased. Further, since third stopper rubber 60 is provided nearer to an engine than first stopper rubber 30 and the direct load transmitting point can exist just above the coupling point between engine-side bracket 26 and another bracket 26A (FIG. 11) which is directly fixed to an engine, a moment arm L between axis of mount 10 and the coupling point between brackets 26 and 26A is changed to a very small moment arm $L_0$ (FIG. 11) and little moment acts on mount 10 when the excessively large load is transmitted between engine-side bracket 26 and body-side bracket 28. This makes it possible to construct brackets 26 and 28 small.

Although only several exemplary embodiments of the present invention have been described in detail above, those skilled in the art will readily appreciate that many modifications and alterations are possible in the exemplary embodiments without materially departing from the novel teachings and advantages of the invention. Accordingly, all such modifications and alterations are intended to be included within the spirit and scope of the present invention as defined in the following claims.

What is claimed is:

1. A composite engine mount for supporting an engine on a vehicle body defining three orthogonal directions, a longitudinal direction, a transverse direction perpendicular to said longitudinal direction, and a vertical direction perpendicular to a plane defined by said longitudinal and transverse directions, said composite engine mount comprising:
   a first member of rigid material to be fixed to an engine-side bracket;
   a second member of rigid material to be fixed to a body-side bracket, said first and second members defining a space inside said second member into which one portion of said first member extends;
   an elastic member extending between and connected to said first and second members so as to allow said first and second members to move relative to each other; and
   a first stopper rubber fixed to said one portion of said first member for cooperation with said second member to bear loads in each of said orthogonal directions.

2. A composite engine mount for supporting an engine on a vehicle body defining three orthogonal directions, a longitudinal direction, a transverse direction perpendicular to said longitudinal direction, and a vertical direction perpendicular to a plane defined by said longitudinal and transverse directions, said composite engine mount comprising:
   a first member of rigid material to be fixed to an engine-side bracket, said first member including a main portion and a stopper arm extending radially outward and obliquely downward from said main portion;
   a second member of rigid material to be fixed to a body-side bracket, said second member including an annular portion radially spaced outward from said main portion of said first member and axially overlapping in the vertical direction with at least one portion of said main portion of said first member and a lip extending radially inward from said annular portion, said first and second members defining a space opening upward between said annular portion of said second member and said main portion of said first member, said stopper arm of said first member extending into said space;
   an elastic member extending between and connected to said first and second members so as to allow said first and second members to move relative to each other; and
   a first stopper rubber fixed to said stopper arm of said first member for cooperation with said second member to bear loads in each of said orthogonal directions.

3. The composite engine mount according to claim 2, wherein said first stopper rubber and said second member define therebetween a front and rear stopper clearance in the longitudinal direction, a left and right stopper clearance in the transverse direction and a rebound stopper clearance in the vertical direction when no relative movement takes place between said first and second members, said first stopper rubber striking said second member when a relative movement greater than any one of said stopper clearances takes place between said first and second members.

4. The composite engine mount according to claim 2, further comprising a second stopper rubber provided axially between said lip of said second member and the engine-side bracket to which said first member is fixed, said second stopper rubber providing a bound stopper clearance in a vertical direction in cooperation with said second member and said engine-side bracket.

5. The composite engine mount according to claim 4, wherein said second stopper rubber and one of said lip of said second member and said engine-side bracket define the bound stopper clearance therebetween when no relative movement takes place between said first and second members, said second stopper rubber striking said lip and said engine-side bracket to be squeezed by said lip and engine-side bracket when a relative movement greater than said bound stopper clearance takes place between said first and second members.

6. The composite engine mount according to claim 5, wherein a space which is greater than said bound stopper clearance is provided between a lower surface of said first stopper rubber and an upper surface of said elastic member in the vertical direction.

7. The composite engine mount according to claim 3, further comprising an elastic layer of rubber fixed to an inside surface of said annular portion of said second member, said elastic layer being integrally connected to said elastic member, an inside surface of said elastic layer and an outside surface of said first stopper rubber defining said front and rear stopper clearance and said left and right stopper clearance.

8. The composite engine mount according to claim 2, wherein said second member further includes a container portion on a lower side of said annular portion, said container portion and said elastic member defining a substantially closed space therebetween, said closed space including a liquid chamber and a gas chamber which are separated from each other by a diaphragm, said liquid chamber including a plurality of sub-chambers substantially separated from each other by a spacer having an orifice, said gas chamber being connected to an atmosphere via a hole formed in said second member.

9. The composite engine mount according to claim 7, wherein an outside surface of said stopper arm, an outside surface of said first stopper rubber, an inside surface of said elastic layer and an inside surface of said annular portion of said second member have arc cross sections having a common axis.

10. The composite engine mount according to claim 7, wherein
one portion of an outside surface of said first stopper rubber is curved to form an arc cross section, and
one portion of an outside surface of said elastic layer radially corresponding to said one portion of said outside surface of said first stopper rubber is curved to form an arc cross section, a radius of arc of said one portion of said inside surface of said elastic layer and a radius of arc of said outside surface of said one portion of said first stopper rubber being equal to each other.

11. The composite engine mount according to claim 7, wherein
one portion of an outside surface of said first stopper rubber is curved to form a striking curved surface with an arc cross section, and
one portion of an outside surface of said elastic layer radially corresponding to said one portion of said outside surface of said first stopper rubber is curved to form a receiving curved surface with an arc cross section, a radius of arc of said striking curved surface and a radius of arc of said receiving curved surface being equal to each other, a center of arc of said striking curved surface and a center of arc of said receiving curved surface being offset from each other in one of said longitudinal and transverse directions of said vehicle body.

12. The composite engine mount according to claim 11, wherein said striking curved surface and said receiving curved surface oppose each other in said one direction and are provided on each side of an axis of said engine mount in said one direction.

13. The composite engine mount according to claim 11, wherein said outside surface of said first stopper rubber extending away from said striking curved surface recedes from a circumferential extension of said striking curved surface toward an axis of said engine mount in the other direction with respect to said one direction.

* * * * *